(12) United States Patent
Stanford et al.

(10) Patent No.: US 10,093,473 B1
(45) Date of Patent: Oct. 9, 2018

(54) BANANA-STORING DEVICE

(71) Applicants: Paris Stanford, Barstow, CA (US);
Vivian Stanford, Barstow, CA (US)

(72) Inventors: Paris Stanford, Barstow, CA (US);
Vivian Stanford, Barstow, CA (US)

(*) Notice: Subject to any disclaimer, the term of this patent is extended or adjusted under 35 U.S.C. 154(b) by 371 days.

(21) Appl. No.: 14/988,817

(22) Filed: Jan. 6, 2016

(51) Int. Cl.
*B65D 85/34* (2006.01)
*B65D 81/28* (2006.01)
*B65D 47/32* (2006.01)
*B65D 25/10* (2006.01)
*A23B 7/159* (2006.01)
*A23B 7/157* (2006.01)

(52) U.S. Cl.
CPC .............. *B65D 81/28* (2013.01); *A23B 7/157* (2013.01); *A23B 7/159* (2013.01); *B65D 25/10* (2013.01); *B65D 47/32* (2013.01); *B65D 85/34* (2013.01); *A23V 2002/00* (2013.01)

(58) Field of Classification Search
CPC ........ A23B 7/157; B65D 25/10; B65D 85/34; B65D 81/28; B65D 47/32; A23V 2002/00; A47B 75/00; A47F 7/0071
USPC ........... 99/467–479; 206/6.1, 284, 301, 348; 211/85.4; 220/475, 913, 916
See application file for complete search history.

(56) References Cited

U.S. PATENT DOCUMENTS

| 5,771,790 | A | 6/1998 | Barrows |
| 5,797,312 | A | 8/1998 | Brant |
| 5,826,843 | A * | 10/1998 | Sturm .................... A47F 7/0071 211/13.1 |
| 6,325,234 | B1 | 12/2001 | Legaspi |
| D569,172 | S | 5/2008 | Bledsoe |
| 8,113,246 | B2 | 2/2012 | Hsieh |
| 8,186,533 | B1 | 5/2012 | Tseng |
| D661,953 | S | 6/2012 | Harshman |
| 2008/0226775 | A1* | 9/2008 | Forsyth .................. A23B 7/144 426/106 |
| 2011/0253562 | A1* | 10/2011 | Machado ............... B65D 81/28 206/213.1 |

FOREIGN PATENT DOCUMENTS

WO    WO2006118668 A1    11/2006

OTHER PUBLICATIONS

Collecting Warehouse, (website: www. collectingwarehouse.com), Oct. 15, 2013.*

* cited by examiner

*Primary Examiner* — Dana Ross
*Assistant Examiner* — James Sims, III

(57) ABSTRACT

The banana storage device is a dome shaped container that is adapted for use in storing bananas. The banana storage device is an airtight container that protects bananas from air bacteria which can help preserve the banana and keep it fresh for an extended period of time. The banana storage device comprises a base, a banana tree, and a dome.

6 Claims, 4 Drawing Sheets

US 10,093,473 B1

BANANA-STORING DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of food storage receptacles, more specifically, a device adapted for use in the storage and preservation of bananas.

SUMMARY OF INVENTION

The banana storage device is a dome shaped container that is adapted for use in storing bananas. The banana storage device is an airtight container that protects bananas from air bacteria, which preserve the banana and keep them fresh for an extended period of time.

These together with additional objects, features and advantages of the banana storage device will be readily apparent to those of ordinary skill in the art upon reading the following detailed description of the presently preferred, but nonetheless illustrative, embodiments when taken in conjunction with the accompanying drawings.

In this respect, before explaining the current embodiments of the banana storage device in detail, it is to be understood that the banana storage device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the banana storage device.

It is therefore important that the claims be regarded as including such equivalent construction insofar as they do not depart from the spirit and scope of the banana storage device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
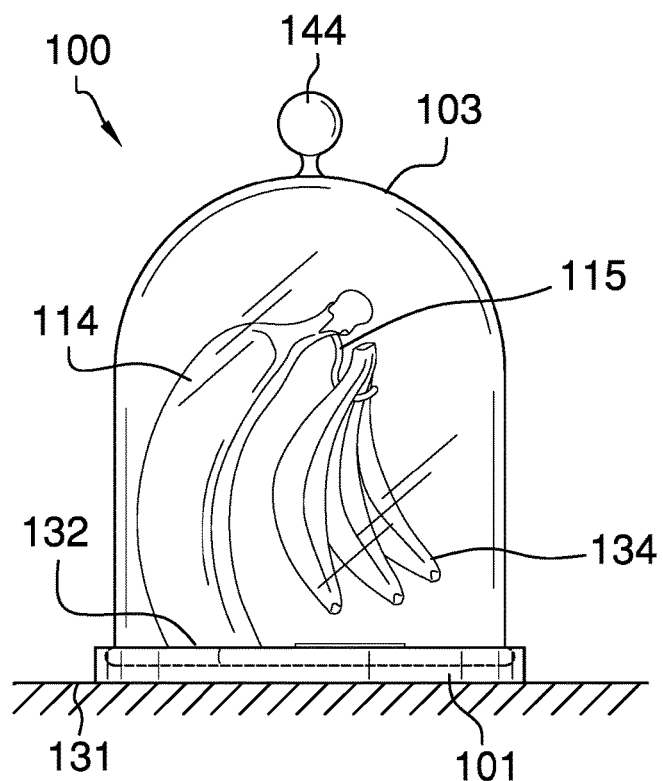
FIG. 1 is a front view of an embodiment of the disclosure.
Figure 2:
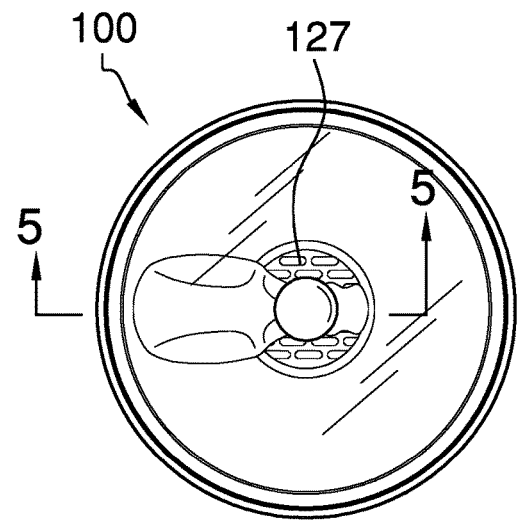
FIG. 2 is a top view of an embodiment of the disclosure.
Figure 3:
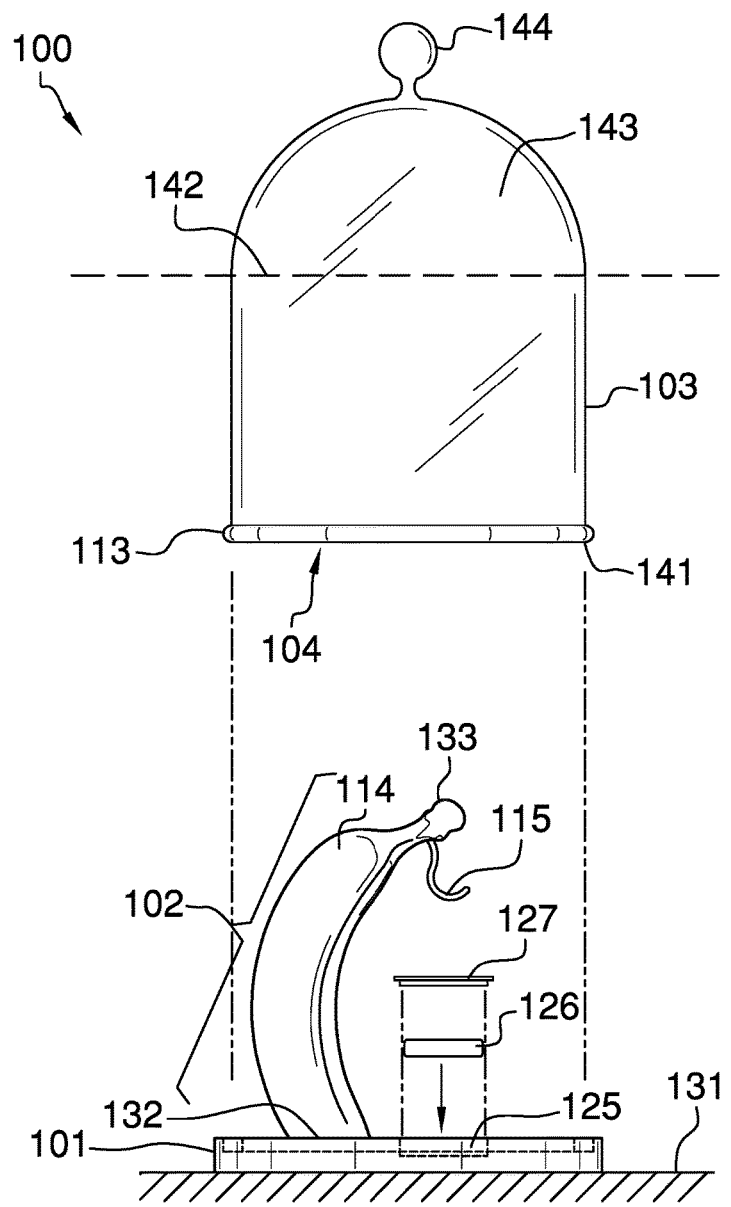
FIG. 3 is an exploded view of an embodiment of the disclosure.
Figure 4:
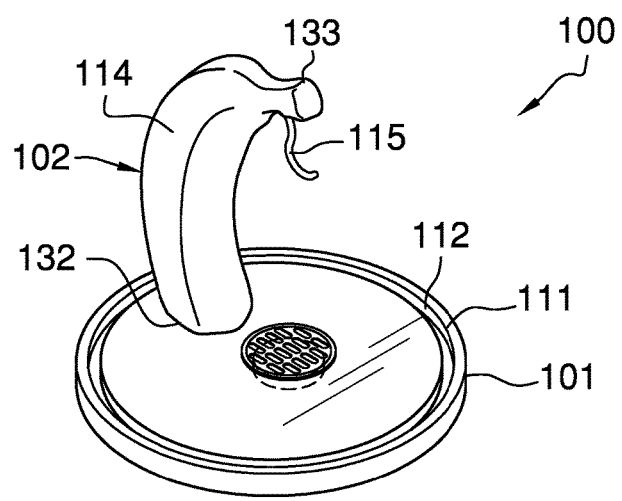
FIG. 4 is a perspective detail view of an embodiment of the disclosure.
Figure 5:
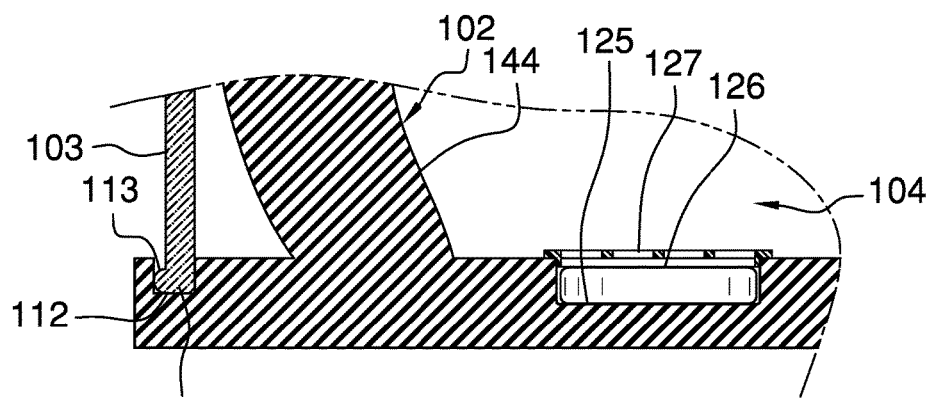
FIG. 5 is a detailed cross-sectional view of an embodiment of the disclosure across 5-5.
Figure 6:
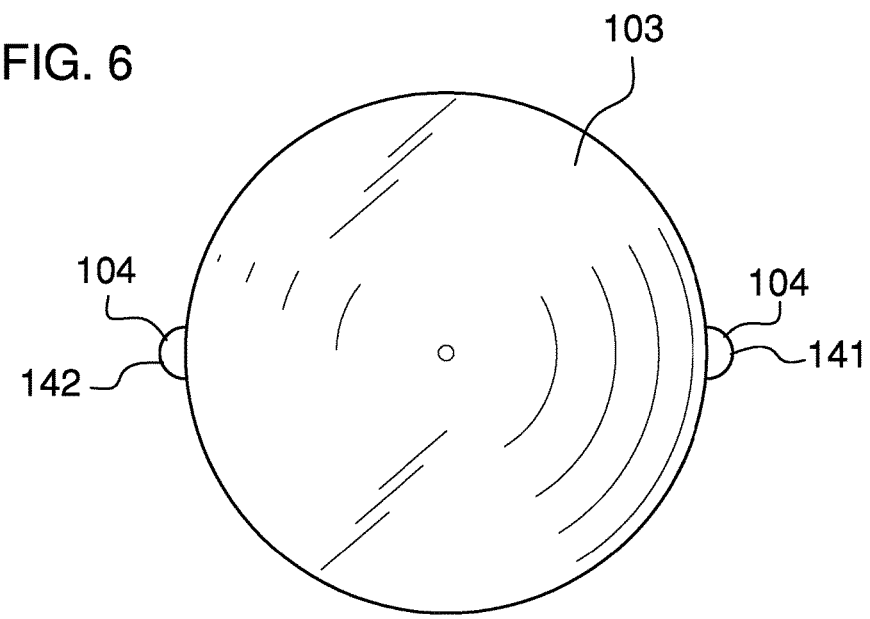
FIG. 6 is a detail view of an embodiment of the disclosure.
Figure 7:
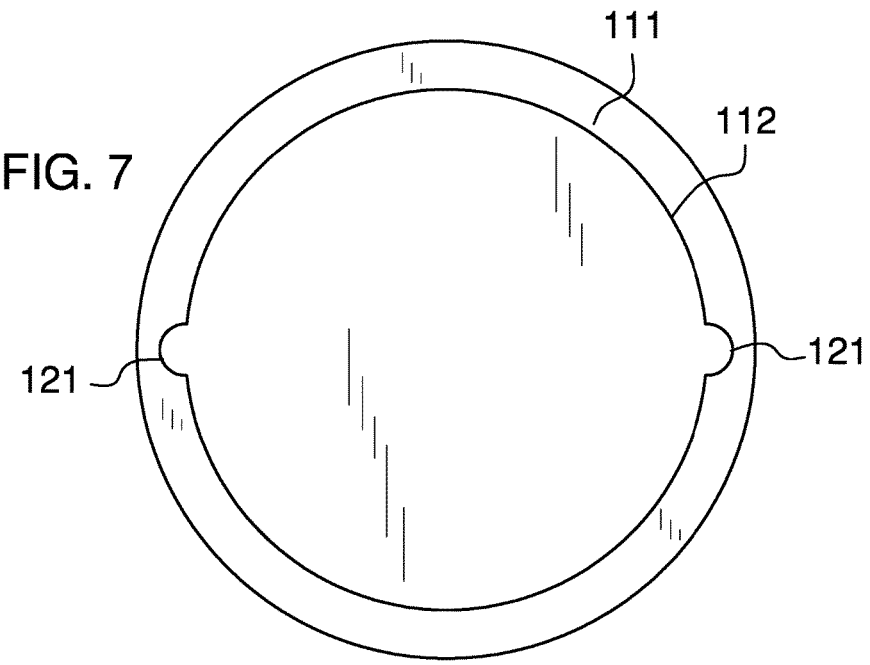
FIG. 7 is a detail view of an embodiment of the disclosure.

Detailed reference will now be made to a first potential embodiment of the disclosure, which is illustrated in FIGS. 1 through 7. The banana storage device 100 (hereinafter invention) comprises a base 101, a banana tree 102, and a dome 103.

The base 101 is the structure upon which the invention 100 is supported. The base 101 is a flat plate 111 that is placed on the supporting surface 131 and upon which the invention 100 rests. The bottom 132 of the base 101 rests on the supporting surface 131. The banana tree 102 and the dome 103 are placed on the top 133 side of the base 101. Also formed within the top 133 side of the base 111 is a permanganate chamber 125. The permanganate chamber 125 is a hole that sized to receive a disk of potassium permanganate 126. Disks of potassium permanganate 126 are commercially available oxidizing agents that are used to inhibit the ripening of the bananas 134 by oxidizing the ethylene gas that is generated by the bananas 134. The permanganate chamber 125 is enclosed with a vented cover 127 that allows the free flow of air through the permanganate chamber 125.

The purpose of the banana tree 102 is to provide a structure from which to hang bananas 134. The banana tree 102 further comprises a trunk 114 and a hook 115. The trunk 114 is a curved structure that is further defined with a bottom 132 end and a top end 133. The bottom end 132 of the trunk 114 is mounted on the base 101. The top end 133 of the trunk 114 has the hook 115 attached to it. The purpose of the hook 115 is to provide a place to hang one or more fingers of bananas 134. The banana tree 102 is formed to be reminiscent of a banana 134 including the banana's 134 characteristic curve. Methods to form a banana tree 102 with these characteristics and that is readily reproducible are well known within the community of sculpture artists.

The dome 103 is a rounded structure that serves to enclose a space called a vault 104 when it is placed on the base 101. The vault 104 is the space within which the banana tree 102 and any stored bananas 134 are kept. The dome 103 is formed in a hollow cylindrical shape with a first end 141 and a second end 142. The first end 141 of the dome 103 is designed to fit on the base 101. The second end 142 of the dome 103 is closed with a third hemispherical cap 143. Where the axis of the cylinder formed by the dome 103 intersects with the third hemispherical cap 143 a fourth knob 144 is mounted on the third hemispherical cap 143, The fourth knob 144 acts as a handle for removing the dome 103 from the base 101. Finally the first end 141 of the dome 103 is able to be seated into a groove 112 of the base 101.

The base 101 has formed in it the groove 112 that is sized to receive the first end 141 of the dome 103. The dome 103 is fitted with a capture lip 113 at the first end 141. The capture lip 113 is seated within the groove 112 of the base 101.

The base 101 can be formed from ceramic, metal, wood, or molded plastic. The banana tree 102 can be formed as a single unit with the base 101 if the base 101 is made of ceramic, metal or molded plastic. If the base 101 is made of wood, the banana tree 102 can be screwed into or glued on to the base 101. If the base 101 is made of ceramic, metal or molded plastic, the groove 112 can be formed as part of the base 101. If the base 101 is made of wood, a router saw can be made to form the groove 112. The dome 103 can be molded from polycarbonate.

The following definition used in this disclosure:

Hook: As used in this disclosure, a hook is an object that is curved or bent back at an angle such that items can be hung on or caught by the object.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A food storage device comprising:
a base, a banana tree, and a dome;
wherein the food storage device is adapted to store bananas;
wherein the dome is able to be seated atop of the base;
wherein an element of the food storage device is in the shape of a banana;
wherein the base is a flat plate that is placed on a supporting surface;
wherein the banana tree and the dome are placed on a top side of the base;
wherein the banana tree further comprises a trunk and a hook;
wherein the trunk is a curved structure that is further defined with a first bottom end and a second end;
wherein the first bottom end of the trunk is mounted on the base;
wherein a second top end of the trunk has the hook attached to the trunk;
wherein formed within the top side of the base is a permanganate chamber;
wherein the banana tree is formed to be reminiscent of a banana including the banana's characteristic curve;
wherein the dome is a structure that serves to enclose a vault;
wherein the permanganate chamber is a hole that sized to receive a disk of potassium permanganate;
wherein the disk of potassium permanganate inhibits the ripening of the bananas by oxidizing the ethylene gas that is generated by the bananas;
wherein the permanganate chamber is enclosed with a vented cover that allows the free flow of air through the permanganate chamber.

2. The food storage device according to claim 1 wherein the dome comprises a hollow cylindrical shape.

3. The food storage device according to claim 2 wherein the dome further comprises a first hemispherical cap.

4. The food storage device according to claim 3 wherein a first knob is mounted on the first hemispherical cap.

5. The food storage device according to claim 4 wherein the base has the groove formed therein.

6. The food storage device according to claim 5 wherein the groove is sized to receive the dome.

\* \* \* \* \*